United States Patent Office 3,332,743
Patented July 25, 1967

3,332,743
DIAGNOSTIC TEST FOR DENTAL CARIES ACTIVITY
George H. Green, U.S. Navy, assignor to the United States of America as represented by the Secretary of the Navy
No Drawing. Filed June 27, 1963, Ser. No. 291,215
6 Claims. (Cl. 23—230)

The invention described herein may be manufactured and used by or for the Government of the United States of America for governmental purposes without the payment of any royalties thereon or therefor.

The invention relates to a test which distinguishes the presence or absence of dental caries and more particularly the test evaluates the dental caries activity in an individual.

The ability to predict whether the teeth of a particular individual are likely to develop the disease of dental caries is indeed very desirable from the standpoint of treatment and preventive dentistry. Although the disease is usually characterized by the development of cavities within the teeth, these cavities are in effect the end result of the disease and the mere presence or absence of cavities is not indicative of the presence or absence of the disease.

If the disease of dental caries can be anticipated or detected in its very early stages, the development of cavities can be effectively prevented with proper measures affecting diet, oral hygiene and improved health habits. A dentist faced with the positive indication of caries can undertake definitive treatment and also provide emergency or extensive preparation for affected individuals with rampant caries.

Dental caries denotes an injury to the teeth resulting from acids or other potentially harmful products formed by bacteria that attack carbohydrates in a stagnant environment.

Previous tests indicated the oral condition of an individual by measuring the rate of acid production in the saliva or by indicating the presence of a particular microorganism in the mouth. These tests involved either a direct bacterial count or the measurement of acid production. In the bacterial count method, a saliva specimen was plated in agar and incubated for 3–4 days to form cultures. In measuring the acid production, saliva was added to a tube with a pH indicator and incubated at 37° C. for periods of 24 to 72 hours to observe a color change in the solution. These tests were time-consuming and required skilled workers to practice sterile techniques with complex and expensive equipment.

The present invention provides a rapid test for detecting dental caries activity, one which is relatively simple to perform but which has been found to be reliable and useful in determining susceptibility to tooth decay. More specifically, the test may be used to provide a measure of the dental caries activity in an individual and quantitatively indicate various levels of this activity. The test is based upon the finding that the salivary oxidation-reduction rate can be directly correlated with the individual's DMF index. The test in its practical form employs a buffered substrate solution and an indicator dye for measuring the oxidation rate of a saliva sample. The test gives a color response at room temperature based upon the sum total of metabolic activity of the saliva and not on a single metabolic product as in previous tests. Moreover, the present test can be performed rapidly before the patient leaves the dental office and provides an impressive visual demonstration of the patient's dental condition. The test is sufficiently simple that it may be performed by the dental assistant.

In accordance with the present invention, a buffered substrate solution containing a suitable indicator dye measures the oxidation rate of a saliva specimen by measuring the time period in which the indicator dye undergoes a distinct color change, and the time period required to induce this color change is taken as a measure of dental caries activity.

It is therefore an object of the present invention to provide an improved test for detecting and measuring dental caries activity in an individual wherein the test is considerably more reliable and accurate than previous dental caries tests.

Another object of the invention is to provide a vivid, visual demonstration in the presence of a patient as a means of impressing the need for dental hygiene and other corrective measures.

A further object of the invention is to provide a greater measure of accuracy in the use of an indicator dye with a novel buffered substrate solution to measure the total metabolic activity in a saliva sample.

Further objects and advantages and a fuller understanding of the present invention will become apparent by reference to the following detailed description.

In accordance with the invention, a definite amount of saliva sample is obtained from an individual whose caries activity is to be determined and added to a measured quantity of buffered substrate solution containing therein the indicator dye, diazoresorcinol (resazurin). The dye which is colored blue is reduced by the metabolic reaction of the saliva to resorufin which has a distinctive red color. The color change from blue to red is indicative of the oxidation-reduction rate of the saliva sample. The dye is irreversibly reduced and does not alter the oxidation-reduction pattern of the saliva.

The present test employs a substrate dye solution which introduces definite materials into the saliva specimen in order to minimize the differences normally encountered in various oral environments. Since residual oral substrates, such as, monosaccharides, disaccharides, polysaccharides, acids, and other substances temporarily present in the mouth may tend to alter the metabolic rate of the saliva, the present test introduces a specific amount of substrate for a more accurate measurement of the metabolic potential of the saliva. In fact, the oral environment of some individuals with a high rate of salivary metabolic activity may have a temporary lack of any metabolizable substrate. Thus, unless a specific amount of substrate is added in every instance, a false recording of the individual's dental caries activity may result.

The substrate which is employed in the present test solution includes dextrose or lactose in combination with tryptose and sodium chloride. The substrate is prepared by adding 1.0% dextrose or lactose, 1.0% tryptose and 0.25% NaCl in a phosphate buffer solution (0.05 M, pH 7.2). A suitable phosphate buffer solution includes sodium dihydrogen phosphate and disodium hydrogen phosphate.

The test solution is formed by adding 1.25 g. diazoresorcinol per liter of buffered solution. The invention also provides for a buffered substrate and dye in tablet form which is readily dissolved in distilled water to form the test solution. The diazoresorcinol is unstable to light and the test solution should preferably be kept in an opaque container. If the solution is to be kept for long periods, the substrate composition should contain lactose, since this sugar is more resistant to bacterial contamination than dextrose.

In carrying out the test in accordance with the present invention, an equal amount of saliva specimen is added to the test solution and shaken together thoroughly. The time required for the solution to change from a blue color to a red color is taken as a measure of dental caries activity. As a result of the buffered substrate solution, the color change in the present test occurs in a period of approximately an hour; the time being subdivided in convenient intervals during which the color change is recorded. A convenient classification of caries activity based on time required for the color change to occur is shown in the following table.

| Classification of caries activity: | Time of color change (in minutes) |
|---|---|
| Rampant | 5 |
| Highly active | 15 |
| Moderately active | 30 |
| Slightly active | 45 |
| Inactive | 60 |
| Immune | (¹) |

¹ No color change in 60 minutes.

*Procedure*

Paraffin wax is chewed by the individual to stimulate saliva flow. A saliva specimen is collected in a wide mouth collection jar and two ml. of the specimen are transferred to a test tube containing two ml. of indicator solution and the tube is shaken to get a thorough mix. The time required for a complete color change is then recorded. The color change is from a dark blue to a bright red. The only articles required to perform this test consist of a stick of paraffin, a collection jar, pipette dropper, test tube and a supply of indicator solution.

*Indicator solution*

(1) A buffer phosphate solution having a pH in the range of 6.5–7.2 is prepared initially. A buffer solution of this type may include, for example 5.1 gm. $Na_2HPO_4$
1.9 gm. $NaH_2PO_4$
Diluted to 1 liter (2) The following substrate ingredients are added to 200 ml. of the buffer solution:

4.0 gm. tryptose
4.0 gm. dextrose or lactose
1.0 gm. NaCl (3) The substrate solution is autoclaved at low temperature.

(4) The diazorescorcinol, 0.5 gm. is added to another 200 ml. of buffer solution and stirred until dissolved.

(5) The two solutions from step 3 and step 4 are combined to provide 400 ml. of the indicator dye.

In correlating the use of the buffered substrate solution containing the indicator dye, a series of tests were carried out with two extreme groups of individuals that comprise caries active patients and individuals with complete absence of caries experience. The caries active patients were those with ten or more new cavities per year. Repeated tests which were given to these two groups (3 or more tests per week) indicated constant results. The present test was checked against a direct measurement of the salivary-substrate oxidation-reduction potentials on a Beckman potentiometer.

Thus, the diagnostic test of the present invention described herein is considerably more reliable and accurate as a result of the improved test solution. The test provides a more accurate indication of the total metabolic activity in the salivary-substrate solution.

Obviously many modifications and variations of the present invention are possible in the light of the above teachings. It is therefore to be understood that within the scope of the appended claims the invention may be practiced otherwise than as specifically described.

What is claimed is:
1. A test solution for evaluating dental caries activity of a saliva sample comprising:
 (a) a phosphate buffered substrate solution at a pH of about 6.5 to 7.2,
 (b) said solution by weight containing approximately 0.25% sodium chloride, 1% tryptose and 1% sugar from the group of sugars consisting of dextrose and lactose, and
 (c) diazoresorcinol indicator in said solution.
2. A test solution for evaluating dental caries activity of a saliva sample comprising:
 (a) a phosphate buffered substrate solution at a pH of about 6.5 to 7.2,
 (b) said solution by weight containing approximately 0.25% sodium chloride, 1% tryptose, 1% dextrose, and
 (c) diazoresorcinol indicator in said solution.
3. A test solution for evaluating dental caries activity of a saliva sample comprising:
 (a) a phosphate buffered substrate solution at a pH of about 6.5 to 7.2,
 (b) said solution by weight containing approximately 0.25% sodium chloride, 1% tryptose, 1% lactose, and
 (c) diazoresorcinol indicator in said solution.
4. A test solution for evaluating dental caries activity of a saliva sample comprising:
 (a) a phosphate buffer for adjusting the pH of said solution at about 6.5 to 7.2,
 (b) a substrate composition of about 0.25% sodium chloride, 1% tryptose and 1% lactose, said percentages being by weight of the test solution, and
 (c) diazoresorcinol indicator,
 (d) said buffer, said composition and said indicator being combined in a sterile aqueous solution.
5. A test for evaluating dental caries activity of a saliva sample comprising:
 (a) adding an equal amount of said saliva sample by volume to a phosphate buffered solution of pH about 6.5 to 7.2 containing by weight about 0.25% sodium chloride, about 1% tryptose and about 1% of a sugar of the group consisting of dextrose and lactose,
 (b) said solution containing therein diazoresorcinol indicator, and
 (c) determining the time interval required for the color of said solution to change from blue to red as a measure of said activity.
6. A test for evaluating dental caries activity of a saliva sample as defined in claim 5, wherein the sugar in the phosphate buffered solution is dextrose and the diazoresorcinol is present in the amount of about 0.125% by weight of the solution.

References Cited

Green: Journal of Dental Research, vol. 39, No. 4, pp. 699–700, July–August 1960.

Rapp: Illinois Dental Journal, vol. 31, No. 5, pp. 290–295, May 1962.

Rosen et al.: Journal of the American Dental Association, vol. 67, No. 6, pp. 877–878, December 1963.

LEWIS GOTTS, *Primary Examiner.*

ELBERT L. ROBERTS, *Examiner.*

R. HUFF, *Assistant Examiner.*